United States Patent Office 2,999,176
Patented Sept. 5, 1961

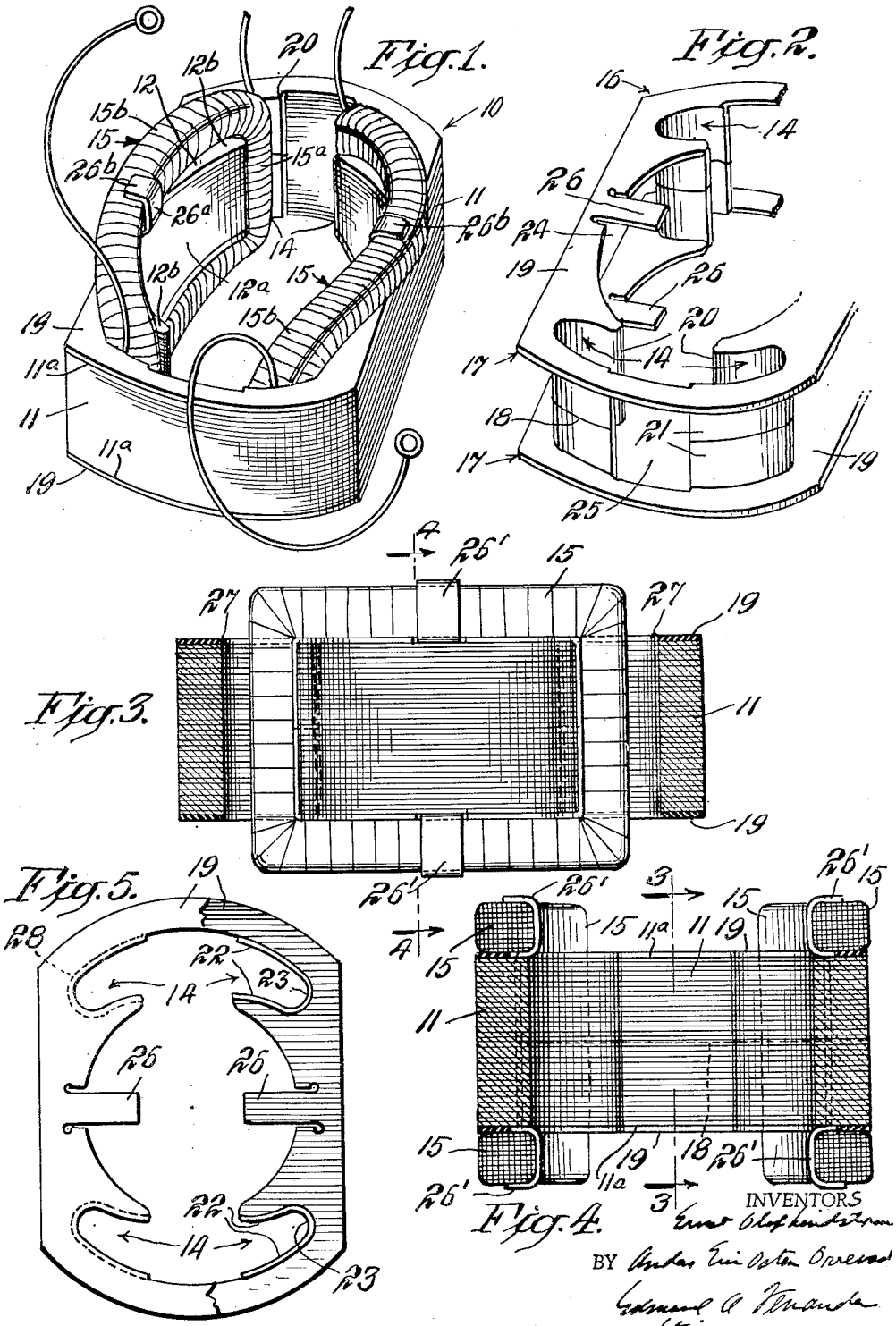

2,999,176
STATOR FOR DYNAMO-ELECTRIC MACHINES
Ernst Olof Lindström, Vallingby, and Anders Eric Osten Orrevad, Ballsta, Sweden, assignors to Aktiebolaget Electrolux, Stockholm, Sweden, a corporation of Sweden
Filed June 28, 1957, Ser. No. 668,645
Claims priority, application Sweden June 30, 1956
3 Claims. (Cl. 310—215)

Our invention relates to stators for dynamo-electric machines.

In dynamo-electric machines it is the practice to insulate a coil from the stator core in the slotted regions of which it is positioned.

The object of our invention is to provide an improvement for effectively insulating a coil from a stator, which produces an inexpensive and easily manufactured construction. We accomplish this by providing a preformed multi-section insulation body which is self-sustaining and whose parts or sections can be readily positioned on a stator core.

The invention, together with the above and other objects and advantages thereof, will be more fully understood upon reference to the following description and accompanying drawing forming a part of this specification, of which:

FIG. 1 is a perspective view of a stator of a dynamo-electric machine embodying our invention;

FIG. 2 is a fragmentary perspective view of insulation details shown in FIG. 1 to illustrate the invention more clearly;

FIG. 3 is a sectional view, taken at line 3—3 of FIG. 4, of the stator shown in FIG. 1;

FIG. 4 is a sectional view, taken at line 4—4 of FIG. 3; and

FIG. 5 is a top plan view, partly broken away and in section, of the insulation details shown in FIG. 1.

Referring to the drawing, we have shown our invention in connection with a stator 10 of a dynamo-electric machine having a laminated core structure 11 in which the laminations are held together in any suitable manner, as by riveting, for example. The magnetic field structure 11 comprises an outer yoke and inwardly extending pole pieces 12 defined by spaced slots 14 which receive field coils 15, as best shown in FIG. 1.

The inwardly extending pole pieces 12 terminate in concave-shaped pole faces 12a defining a bore adapted to receive a rotor, each of the pole pieces having leading and lagging pole tips 12b which are spaced from the yoke to provide wall surfaces defining the spaces or slots 14. The field coils 15 include first portions 15a in the spaces 14 and second portions 15b intermediate the first portions 15a, which project beyond the opposing end faces 11a of the magnetic field structure 11.

In accordance with our invention, the coils 15 are insulated from the core structure 11 by a preformed self-sustaining insulation body 16 of the general shape illustrated in FIG. 2. The insulation body 16 is formed of two complementary or symmetrical parts 17 which are disposed closely adjacent to one another and extend from one end face 11a to the opposite end face 11a of the magnetic field structure and are adapted to be held in abutting relation at a joint 18 which is formed therebetween. The insulation elements or parts 17 may be molded from any suitable plastic material, such as nylon, for example, having good dielectric and electrical insulating properties, the plastic material desirably having a relatively high softening temperature whereby stators embodying our invention may be employed in dynamo-electric machines adapted to run at high temperatures.

As best shown in FIG. 2, the insulation body 16 comprises a pair of spaced apart flanges or first wall sections 19 which are of rectangular shape and an interconnecting wall section 20 at each corner of the body which includes the second wall sections 21 of the insulation elements 17. The corner wall sections 20 have opposing inner and outer sides 22 and connecting bottom portions 23 and form the generally U-shaped slots 14 illustrated in FIG. 1 which receive the coils 15. As best seen in FIGS. 2 and 5, the portions of the inter-connecting wall sections 20, which serve as the inner sides 22 of slots 14 of adjacent pole pieces 12, are spaced from one another. The insulation body 16 is essentially open between the corner wall sections 19, as indicated at 24 and 25 in FIG. 2. As seen in FIGS. 2 and 5, each insulation element 17 is provided with a pair of tabs 26 which extend or project toward one another from the long sides thereof.

As shown in FIG. 1, the flanges or first wall sections 19 of the insulation body 16 overlie the opposing faces 11a of the magnetic field structure 11. At each side of the poles 12 the field structure 11 is formed with a slot 27 having a U-shaped configuration similar to that illustrated by the dotted line 28 in FIG. 5. The second wall sections 21 of the insulation elements 17 overlie the slots 27 in the core structure 11, thereby effectively insulating the ends or first portions 15a of the coils 15 from the slotted regions 27 of the core structure in which they are positioned. Since the long sides or second portions 15b of the coils 15 bear against and are in physical contact with the flanges or first wall sections 19 of the insulating elements 17, all parts of the coils are effectively insulated from the core structure 11. The second wall sections 21 of generally U-shaped form are perpendicular to and carried by the first wall sections 19, the second wall sections 21 of the insulating elements 17 extending toward one another from the opposite end faces 11a of the field structure 11. As seen in FIG. 1, the tabs 26 are bent back upon themselves and form clamps having parts 26a and 26b disposed about the long sides or second portions 15b of the coils 15 which hold the latter in position on the core structure, and thus the insulation elements 17 will be held in abutting relation on the core structure 11. As illustrated in FIG. 1, the clamp parts 26a project axially of the field structure 11 and beyond the end faces 11a thereof from the flanges or first insulating wall sections 19 at the vicinities of the concave-shaped faces 12a of the pole pieces 12. The clamp parts 26b are joined to the outer extremities of the clamp parts 26a and project radially outward toward the outer periphery of the yoke and overlie the second coil portions 15a to hold the latter at the first wall sections or flanges 19 of the insulating elements 17.

When the stator 10 is assembled, the insulation parts 17 are positioned over the core structure 11 at opposing faces thereof and are moved toward one another until the corner wall sections 20 are in abutting relation and the flanges 19 overlie the opposite faces of the core structure, as seen in FIGS. 1 and 2. The coils 15 are next inserted into the slots 14, and the tabs 26 are then bent back upon themselves to form the clamps having parts 26a and 26b.

It will thus be seen that we have provided an improved stator for dynamo-electric machines in which the flanges 19 of the preformed insulation body 16 may be effectively employed to cover the ends of rivets or other fastening members passing through apertured regions of the core structure 11 for holding the laminations together. Since the flanges 19 and corner wall sections 20 effectively insulate all parts of the coils 15 from the core structure 10, the need for wrapping insulation tape about the coil windings of stators of the kind illustrated and described above is eliminated, and the fabrication of the stator is simplified. While we have illustrated the corner sections 20 of the insulation parts 17 in abutting relation at 18 in the preferred embodiment, it may be desirable in certain instances to provide walls 21 at the corners of the insulation parts 17 which are adapted to overlap one another when positioned on a core structure. In either case, an inexpensive and easily manufactured construction is produced by reason of the fact that the preformed insulation parts 17 are self-sustaining.

Although we have illustrated and described a particular embodiment of our invention, we do not desire to be limited to the particular arrangement set forth, and we intend in the following claims to cover all modifications which do not depart from the spirit and scope of our invention.

What we claim is:

1. In a dynamo-electric machine, a magnetic field structure of annular form having a yoke and inwardly extending pole pieces which terminate in concave-shaped pole faces defining a bore adapted to receive a rotor, each of the pole pieces having leading and lagging pole tips which are spaced from the yoke to provide wall surfaces defining spaces, the pole pieces having field coils including first portions in the spaces and second portions intermediate the first portions which project beyond the end faces of the magnetic field structure, means comprising a pair of preformed self-sustaining insulating elements which are disposed closely adjacent to one another and extend from one end face to the opposite end face of the magnetic field structure for insulating at least one of the coils from the field structure, each insulating element including a first wall section overlying an end face of the magnetic field structure to insulate the second portions of the coil therefrom, at least one of said elements having a plurality of second wall sections substantially perpendicular to its first wall section which are of generally U-shaped form and overlie the wall surfaces defining the spaces to insulate the first portions of the coil from the magnetic field structure, the second wall sections of said one element being carried by the first wall section thereof and extending toward the first wall section of said other element, and means for holding the second portions of the field coil at the first wall sections of said insulating elements, said last-mentioned holding means including parts which project axially of the magnetic field structure and beyond the end faces thereof from the first wall sections of the insulating elements at the vicinities of the concave-shaped faces of the pole pieces.

2. In a dynamo-electric machine, a magnetic field structure of annular form having a yoke and inwardly extending pole pieces which terminate in concave-shaped pole faces defining a bore adapted to receive a rotor, each of the pole pieces having leading and lagging pole tips which are spaced from the yoke to provide wall surfaces defining spaces, the pole pieces having field coils including first portions in the spaces and second portions intermediate the first portions which project beyond the end faces of the magnetic field structure, means comprising a pair of preformed self-sustaining symmetrical insulating elements which are disposed closely adjacent to one another and extend from one end face to the opposite end face of the magnetic field structure for insulating at least one of the coils from the field structure, each insulating element including a first wall section overlying an end face of the magnetic field structure to insulate the second portions of the coil therefrom, each element having a plurality of second wall sections substantially perpendicular to its first wall section which are of generally U-shaped form and overlie the wall surfaces defining the spaces to insulate the first portions of the coil from the magnetic field structure, the second wall sections of each member being carried by the first wall section thereof and extending toward one another from the opposite end faces of the magnetic field structure, and means for holding the second portions of the field coil at the first wall sections of said insulating members, said last-mentioned holding means including parts which project axially of the magnetic field structure and beyond the end faces thereof from the first wall sections of the insulating elements at the vicinities of the concave-shaped faces of the pole pieces.

3. In a dynamo-electric machine, a magnetic field structure of annular form having an outer yoke and inwardly extending pole pieces which are spaced apart and terminate in concave-shaped pole faces defining a bore adapted to receive a rotor, each of the pole pieces having leading and lagging pole tips which are spaced from the yoke to provide wall surfaces defining spaces, the pole pieces having field coils including first portions in the spaces and second portions intermediate the first portions which project beyond the end faces of the magnetic field structure, a preformed self-sustaining insulating unit for at least one of the pole pieces which extends from one end face to the opposite end face of the magnetic field structure to insulate the coil thereon from the magnetic field structure, the insulating unit comprising first wall sections overlying the opposing end faces of the magnetic field structure to insulate the second portions of the said coil therefrom and second wall sections substantially perpendicular thereto which are of generally U-shaped form and overlie the wall surfaces defining the spaces to insulate the first portions of the said coil therefrom, the second wall sections being carried by said unit and extending from one first wall section toward the other first wall section thereof, the first wall sections having elements projecting axially of the magnetic field structure from the opposing end faces at the vicinity of the concave-shaped face of the one pole, the elements defining surfaces which cooperate with the first wall sections to hold the second portions of the said coil against the first wall sections.

References Cited in the file of this patent

UNITED STATES PATENTS

| | | |
|---|---|---|
| 1,797,768 | Goad | Mar. 24, 1931 |
| 2,232,812 | Studer | Feb. 25, 1941 |
| 2,383,019 | Sigmund et al. | Aug. 21, 1945 |
| 2,445,986 | Adamson | July 27, 1948 |
| 2,631,251 | Spielman | Mar. 10, 1953 |